United States Patent [19]
Eom

[11] Patent Number: 6,069,708
[45] Date of Patent: May 30, 2000

[54] APPARATUS FOR OBTAINING DATA ON SCAN STARTING TIMES FOR LASER SCANNING UNITS FOR COLOR PRINTER

[75] Inventor: Yoon-seop Eom, Suwon, Rep. of Korea

[73] Assignee: Samsung Electronics Co., Ltd., Kyungki-Do, Rep. of Korea

[21] Appl. No.: 09/105,265

[22] Filed: Jun. 26, 1998

[30] Foreign Application Priority Data

Oct. 17, 1997 [KR] Rep. of Korea ...................... 97-53345

[51] Int. Cl.⁷ ................................................ G06F 15/00
[52] U.S. Cl. ........................................... 358/1.7; 358/1.9
[58] Field of Search ............................... 358/1.7, 1.8, 1.9, 358/1.1, 1.4, 1.5, 1.6, 1.12, 1.14, 1.15, 1.18, 505, 509, 513, 514, 510, 481, 482, 483, 296, 406, 504, 475, 408, 474, 486, 491, 494; 382/312; 347/235, 233

[56] References Cited

U.S. PATENT DOCUMENTS

| | | | |
|---|---|---|---|
| 4,691,237 | 9/1987 | Shimizu | 358/483 |
| 4,712,118 | 12/1987 | Seto et al. | 358/481 |
| 4,748,513 | 5/1988 | Yamada | 358/481 |
| 5,165,074 | 11/1992 | Melino | 358/481 |
| 5,245,181 | 9/1993 | Cho | 358/481 |
| 5,453,851 | 9/1995 | Faulhaber | 358/482 |

*Primary Examiner*—Dov Popovici
*Attorney, Agent, or Firm*—Sughrue, Mion, Zinn, Macpeak & Seas, PLLC

[57] ABSTRACT

An apparatus for obtaining data on scan starting times for laser scanning units for a color printer is provided. The apparatus includes charge-coupled devices arranged to receive light beams emitted from the respective laser scanning units to predetermined positions at the ends of respective image writing regions; an analog/digital converter for converting analog signals output from the charge-coupled devices into digital signals, the analog signals corresponding to the receiving of the light beams emitted from the laser scanning units; and a central processing unit for adjusting the driving of laser emission of the respective laser scanning units and reading the received digital signals to obtain data on the scan starting time. Adjusting synchronization of scanning is then accomplished by simply storing the data on the scan starting times obtained by the apparatus in the printer. Thus, an additional process of test printing is not required.

6 Claims, 2 Drawing Sheets

APPARATUS FOR OBTAINING DATA ON SCAN STARTING TIMES FOR LASER SCANNING UNITS FOR COLOR PRINTER

BACKGROUND OF THE INVENTION

1. Field of the Invention

The present invention relates to an apparatus for obtaining data on the scan starting times for laser scanning units for a color printer.

2. Description of the Related Art

A typical color printer as shown in FIG. 1, includes: a resetting apparatus 15, laser scanning apparatuses 16, developing apparatuses 17, a drying apparatus 18 and a transferring apparatus 20 which are all arranged adjacent to a photosensitive belt 14 circulated by three rollers 11, 12 and 13, and which are spaced apart from each other by a predetermined distance.

In the process of printing, each of the laser scanning apparatuses 16 scan light beams over the photosensitive belt 14 circulated passed the resetting apparatus 15. An electrostatic latent image is formed on the photosensitive belt 14 by the scanned light beams, and the electrostatic latent image is developed by a developer supplied from each developing apparatus 17. A color image is formed on the photosensitive belt 14 by the laser scanning apparatuses 16 scanning light beams having different color information, and by the developing units 17 developing the scanned color information images using developing materials corresponding thereto. The color image formed on the photosensitive belt 14 by the developing material is passed through the drying apparatus 18 and transferred to a transfer roller 21 rotating in contact with the photosensitive belt 14 according to continuous movement of the photosensitive belt 14. Then, the image on the transfer roller 21 is transferred onto a sheet of paper 23 proceeding forward according to the rotation of the transfer roller 21 and confronting pressure roller 22 pressed against the transfer roller 21.

In the printer performing the above printing process, when light beams of the laser scanning apparatuses 16 corresponding to image information of each color of one page are not irradiated onto the same region of the circulating photosensitive belt 14, the different colors of each image do not align with each other, and the desired image is not formed.

A conventional test printing process is performed to obtain data on the scan starting time for each laser scanning apparatus 16 to suppress misalignment of the colors. The conventional test printing process enables an image of a predetermined pattern to be printed. The alignment of the pattern of each color is measured from the printed paper, and the initial data on the scan starting time for the respective laser scanning apparatuses 16 employed for the test printing process is corrected to compensate for the measured difference in color alignment. The corrected data on the scan starting time is input to a lookup table (not shown).

However, in the process of measuring the error from the paper printed by the test printing process, extensive time is required for artificial correction of the scan starting time to compensate errors.

SUMMARY OF THE INVENTION

To solve the above problem, it is an objective of the present invention to provide an apparatus for obtaining data on the scan starting times for laser scanning units for a color printer in which the data on the scan starting time can be automatically obtained by an electronic system without requiring checking by an operator.

Accordingly, to achieve the above objective, there is provided an apparatus for obtaining data on the scan starting times for laser scanning units for a color printer, including: charge-coupled devices arranged to receive light beams emitted from the respective laser scanning units at predetermined positions corresponding to ends of respective image writing regions; an analog/digital converter for converting analog signals output from the charge-coupled devices corresponding to the detection of the light beams emitted from the laser scanning units into digital signals; and a central processing unit for adjusting the driving of laser emission of the respective laser scanning units and reading the received digital signals to obtain data on the scan starting time.

BRIEF DESCRIPTION OF THE DRAWINGS

The above objective and advantages of the present invention will become more apparent by describing in detail a preferred embodiment thereof with reference to the attached drawings in which.

DESCRIPTION OF THE PREFERRED EMBODIMENT

Figure 1:
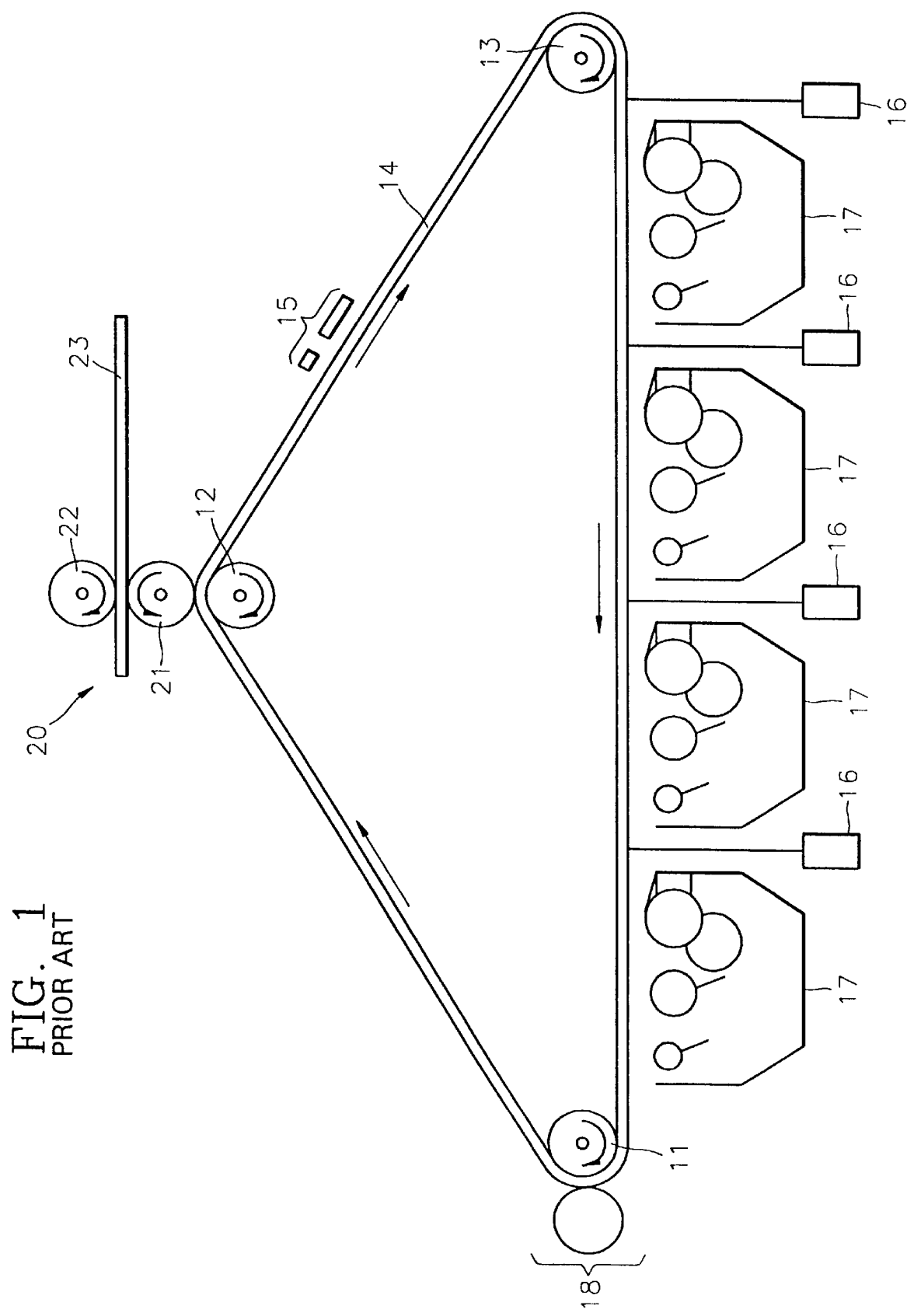
FIG. 1 is a sectional view of a typical color printer.
Figure 2:
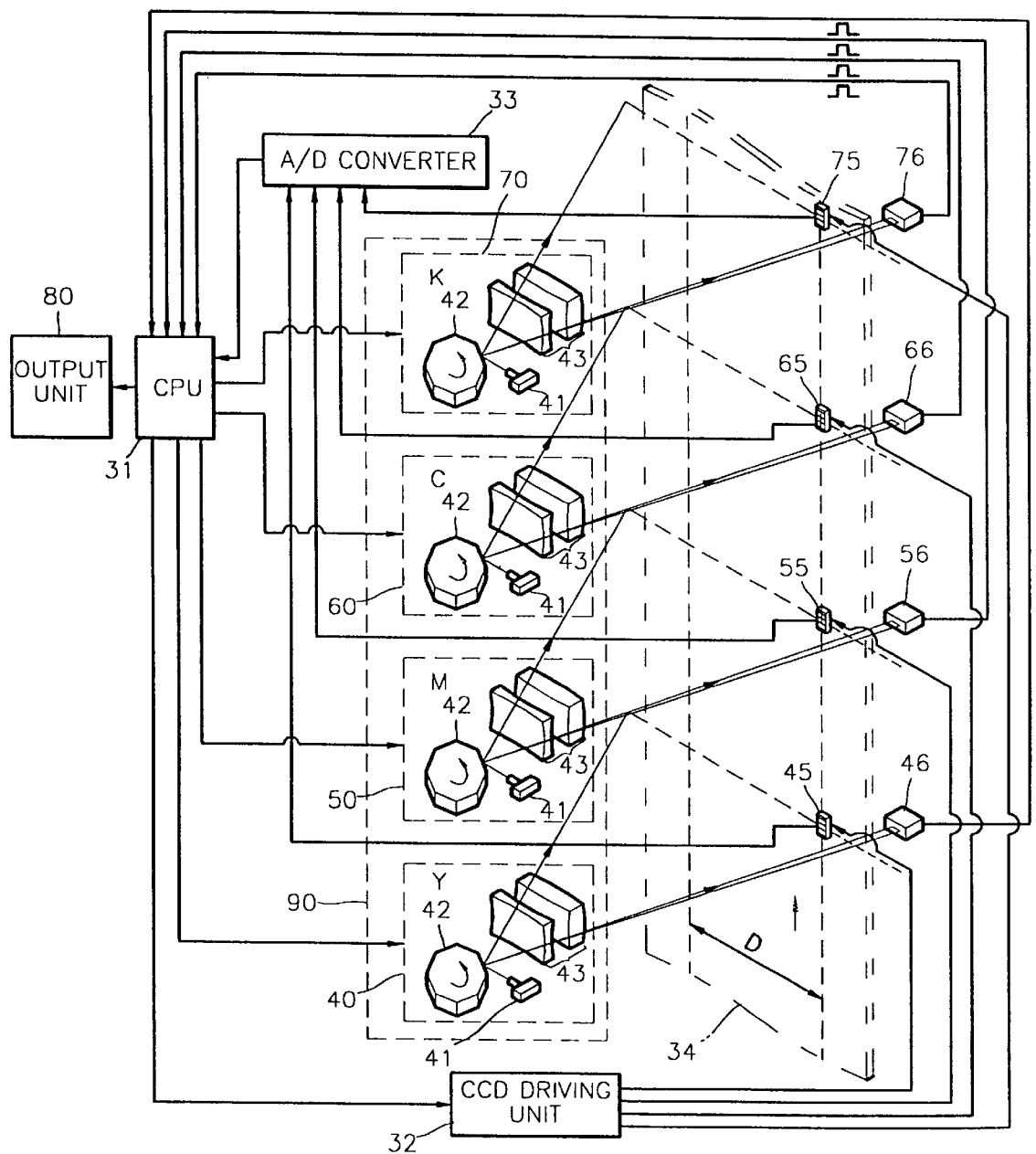
FIG. 2 is a block diagram showing an apparatus for obtaining data on the scan starting times for laser scanning units for a color printer according to the present invention.

Referring to FIG. 2, four laser scanning units 40, 50, 60 and 70 are connected to an apparatus for obtaining data on the scan starting times. The laser scanning units 40, 50, 60, and 70 are spaced apart from each other by a predetermined interval. Charge-coupled devices (CCDs) 45, 55, 65 and 75 are installed in parallel with each other in positions corresponding to respective ends of image writing areas D in the center of the photosensitive belt 34 which is the scanning object surface of the laser scanning units 40, 50, 60 and 70 for scanning yellow (Y), magenta (M), cyan (C) and black (K) data, respectively. The CCDs 45, 55, 65 and 75 are controlled by a CCD driving unit 32 which, in turn, is controlled by a central processing unit (CPU) 31. The CCDs 45, 55, 65, and 75 output to an analog/digital converter 33 signals corresponding to the detection by the respective CCDs of an input light beam. Laser detectors 46, 56, 66 and 76 are arranged corresponding to the respective laser scanning units 40, 50, 60 and 70 to detect light beams emitted from laser scanning units 40, 50, 60 and 70 toward an adjacent edge line of the photosensitive belt 34. The laser detectors 46, 56, 66 and 76 and the laser scanning units 40, 50, 60 and 70 are arranged in the same positions as in the printer in which they will be installed. Each of the respective laser scanning units 40, 50, 60 and 70 includes a light source 41, a polygon mirror 42, a lens unit 43 and a motor (not shown) driving the polygon mirror 42.

An output unit 80 is also provided and includes a printer or a display for printing or displaying data on the scan starting times obtained by the CPU 31.

The above apparatus for obtaining data on the scan starting times can be installed on the printer assembly line in order to obtain data on the scan starting times either before or after alignment of the laser scanning units 40, 50, 60 and 70.

A method for obtaining data on the scan starting times will be described as follows.

A laser scanning unit module 90 is installed on a test bench (not shown) provided in the apparatus for obtaining data on the scan starting times. At this time, the laser scanning units 40, 50, 60 and 70 and the CPU 31 are connected by a cable.

Subsequently, the CPU 31 controls the polygon mirrors 42 of the laser scanning units 40, 50, 60 and 70 to rotate at a predetermined speed.

When the polygon mirrors 42 rotate at a predetermined speed, light beams are emitted from the laser scanning units 40, 50, 60 and 70. At this time, when pulse signals, corresponding to the detection of light beams received by the respective laser detectors 46, 56, 66 and 76, are output by the laser detectors to the CPU 31, the CPU 31 causes the laser scanning units 40, 50, 60 and 70 to temporarily stop emitting light beams during an initial trial scanning standby time. The initial trial scanning standby time is defined as the time interval between the falling pulse edge of a pulse signal output from the laser detector and the beginning of light emission from the light source, and is set to be shorter than the scan starting time. That is, the initial scanning standby time is shorter than a time between a falling edge of the pulse signal output from the laser detector to a start of a light beam from the light source which can reach the end of the image writing region D of the photosensitive belt 34. In order to ensure that the initial trial scanning standby time is shorter than the scan starting time for each laser scanning unit 40, 50, 60, and 70, the initial trial scanning standby time is set to a low value such as zero or a time period less than the expected scan starting time obtained by preliminary calculations.

Accordingly, as will be explained below, in order to obtain scan starting times for each laser scanning unit 40, 50, 60, and 70, the trial scanning standby times which is applied to each laser scanning unit 40, 50, 60, and 70 is sequentially changed by adding a predetermined time value to the previously applied trial scanning standby time. This predetermined time value is preferably set to be equal to that of the exposure time for generating a one shot light beam from the light source.

The laser scanning units 40, 50, 60 and 70 are driven such that only a one shot light beam is emitted from each of the laser scanning units 40, 50, 60, and 70 after the scanning standby time. When the one shot light beam is emitted, the CCD driving unit 32 controlled by the CPU 31 enables the charge-coupled devices 45, 55, 65 and 75 to receive an optical signal. If output signals of the charge-coupled devices 45, 55, 65 and 75 corresponding to the detection of the one shot light beams are not received by the CPU 31 in the first trial, a second trial is performed. Here, as noted above, the scanning standby time for the second trial is obtained by adding the time corresponding to the exposure interval for generating a one shot light beam to the initial trial scanning standby time. The above process is repeated as necessary, increasing the scanning standby time until the output signals of the charge-coupled devices 45, 55, 65 and 75 corresponding to the detection of the one shot light beams are received by the CPU 31. Accordingly, the scan starting time for ensuring proper color printing is determined by the trial scanning standby time which allows the light beam emitted from the laser scanning unit to reach the end of the image writing region D corresponding to the position of the respective CCD.

During the repeated process, when the one shot light beams emitted from the laser scanning units 40, 50, 60 and 70 are detected by the charge-coupled devices 45, 55, 65 and 75, the analog/digital converter 33 supplies corresponding digital signals to the CPU 31. The CPU 31 stores the scanning standby times finally applied as data on the scan starting time for the corresponding laser scanning units 40, 50, 60, and 70, or displays or prints the scanning standby time through the output unit 80. The data on the scan starting times obtained by the CPU 31 are sent to the printer in which the laser scanning unit module 90 is installed so that the controller of the printer can drive the laser scanning units 40, 50, 60, and 70 according to the data on the scan starting times. Finally, it should be noted that the data on the scan starting times can be obtained from the laser scanning units 40, 50, 60 and 70 in accordance with the above steps simultaneously or sequentially.

Accordingly, when the data on the scan starting times is stored in a printer in which the laser scanning unit module 90 is installed, the laser scan starting times of the laser scanning units 40, 50, 60 and 70 can be properly controlled to ensure that images having correct color alignment can be obtained.

According to the above apparatus for obtaining data on the scan starting times for laser scanning units for a printer, scanning synchronization is controlled only by the process of storing the scan starting data obtained through testing in the printer, so that an additional test printing process is not required.

What is claimed is:

1. An apparatus for obtaining data on scan starting times for laser scanning units for a color printer, comprising:

charge-coupled devices arranged to detect light beams emitted from the respective laser scanning units which impinge upon corresponding positions at ends of image writing regions, each of said charge-coupled devices outputting a signal in response to a detection of the respective light beams which impinge upon corresponding positions at the ends of the image writing regions;

a central processing unit for adjusting the emission of light beams from the respective laser scanning units; and a plurality of laser detectors corresponding to the laser scanning units for detecting respective light beams which impinge upon predetermined positions outside the image writing regions, said plurality of laser detectors outputting signals corresponding to detections of the respective light beams by said laser detectors;

wherein said central processing unit obtains data on the scan starting times of the respective laser scanning units based on the signals emitted by said charge-coupled devices and said laser detectors.

2. The apparatus of claim 1, wherein said central processing unit gradually increases a scanning standby time for each of the laser scanning units, wherein the scanning standby time for each laser scanning unit is defined as a time between the detection of a light beam by a respective laser detector to a start of a one shot laser light beam emission from the corresponding laser scanning unit; and wherein said central processing unit further determines a final scanning standby time for each of the laser scanning units based on a time interval between the detection of a light beam by the respective laser detector to the detection of a light beam by a corresponding charge-coupled device, thereby determining the data on a scan starting time for each laser scanning unit.

3. The apparatus of claim 1, further comprising an output apparatus for outputting information on the data on the scan starting times received from said central processing unit.

4. The apparatus of claim 1, wherein said signals output by said charge-coupled devices are analog signals; and further comprising an analog/digital converter for converting the analog signals into digital signals which are input into said central processing unit.

5. A method of obtaining data on scan starting times for laser scanning units for a color printer, comprising for each laser scanning unit the steps of:
- (a) causing a light beam to be emitted from the laser scanning unit so as to impinge upon a predetermined position outside an image writing region;
- (b) temporarily stopping the emission of light from the laser scanning unit for a scanning standby time upon the detection of the light beam which impinges upon the predetermined position outside the image writing region;
- (c) subsequently emitting a light beam from the laser scanning unit and detecting whether the subsequently emitted light beam impinges upon a predetermined position at an end of the image writing region;
- (d) when the subsequently emitted light beam is detected to have impinged upon the predetermined position at the end of the image writing region, outputting the corresponding scanning standby time as a scan starting time for the laser scanning unit;
- (e) when the subsequently emitted light beam is not detected to have impinged upon the predetermined position at the end of the image writing region, increasing the scanning standby time by an incremental time value and repeating steps (a) through (d).

6. The method of obtaining data on scan starting times for laser scanning units for a color printer according to claim 5, wherein the incremental time value corresponds to an exposure interval for generating a one shot light beam.

* * * * *